United States Patent [19]
Munir

[11] Patent Number: 5,502,931
[45] Date of Patent: Apr. 2, 1996

[54] BUILDING ELEMENT AND METHOD OF MANUFACTURING SUCH ELEMENT

[76] Inventor: Hussain Munir, Gomm Road, High Wycomb, Bucks. HP13 7DJ, United Kingdom

[21] Appl. No.: 318,616
[22] PCT Filed: Apr. 8, 1992
[86] PCT No.: PCT/SE92/00229
  § 371 Date: Oct. 7, 1994
  § 102(e) Date: Oct. 7, 1994
[87] PCT Pub. No.: WO93/21402
  PCT Pub. Date: Oct. 28, 1993
[51] Int. Cl.⁶ .................................................. E04B 1/82
[52] U.S. Cl. ............................................ 52/144; 181/290
[58] Field of Search ........................... 52/810, 811, 785, 52/806, 144, 741.1; 181/290, 294; 428/178, 198, 280, 282

[56] References Cited

U.S. PATENT DOCUMENTS

| | | |
|---|---|---|
| 2,326,581 | 8/1943 | Van Cleef ........................... 181/290 X |
| 3,215,225 | 11/1965 | Kirschner . |
| 3,424,270 | 1/1969 | Hartman et al. . |
| 3,472,472 | 10/1969 | Maestrello ........................... 52/144 X |
| 4,487,793 | 12/1984 | Haine, Jr. et al. ................... 181/290 X |
| 4,709,781 | 12/1987 | Scherzer .............................. 181/290 |
| 5,258,585 | 11/1993 | Juriga .................................. 181/290 X |

FOREIGN PATENT DOCUMENTS

| | | |
|---|---|---|
| 1264289 | 2/1972 | United Kingdom . |
| 1514516 | 6/1978 | United Kingdom . |

*Primary Examiner*—Creighton Smith
*Attorney, Agent, or Firm*—Larson and Taylor

[57] ABSTRACT

An integral structural element having improved sound and/or vibration dampening capacity and being composed of two support plates (1, 2) having therebetween spaced layers (3) of a viscoelastic material formed by a liquid synthetic elastomeric material having good adhesive properties and having a temperature resistance high enough to stand the temperature rise occuring due to the internal friction of the material while subjected to vibrations. The viscoelastic material between said two support plates (1, 2) is formed as strings of elastomeric material which are spaced from each other by a distance of 50–500 mm leaving space between the two support plates (1, 2) in the areas between adjacent strings of viscoelastic material (3). Each string (3) of dampening material has a material thickness of 1–5 mm, and a width of 10–50 mm. The structural element may, at the surface thereof to be mounted on a structural base, carry a mat of a natural or synthetic felt fibre material, having a product weight of 300–1200 g/m² and having a thickness of 3–10 mm.

10 Claims, 4 Drawing Sheets

(Test 1)

(Test 2)

(Test 3)

(Test 4)

BUILDING ELEMENT AND METHOD OF MANUFACTURING SUCH ELEMENT

The present invention generally relates to a building element, and the invention is more particularly concerned with a structural or a non-structural building element having improved sound damping and vibration damping properties and being of the known type formed as an integral building unit and composed by two superimposed plate like structural parts having therebetween spaced thin strings or strips of a viscoelastic material.

By damping properties is meant, in the following, both sound damping properties and vibration damping properties, and the invention is intended to damp both low frequency, medium frequency and high frequency sound and vibration. In house building by means of modern building material like concrete, gypsum boards, light weight concrete blocks, different types of plastic materials, but also by means of timber, building board, chip board and other types of wooden material there are often problems in that sounds, vibrations etc. transmit from one apartment to another, both vertically and horizontally, not only by vibrations etc. in the material itself but also by air borne sounds and vibrations. Therefore the invention is concerned with a structural or non-structural building element for use as a sound and vibration damping building element in house building, like in floors, walls, ceilings etc.

Sound and vibration transportation also causes the same type of problems in many types of apparatus like in telephone boxes, in loud speakers, in motor cars, in air planes, in ships, in motor hoods, in refrigerators etc.

Thus, by building material is meant any type of material which can be used as floor structures, wall structures, ceiling structures etc. in ordinary house building, and also for the manufacture of any other types of objects where there is a wish to take advantage of the sound damping or the vibration damping properties of the building element according to the invention or of both the sound damping and the vibration damping properties thereof.

A dampening structural element of the above mentioned type is known for instance from the British patent No 1,514,516 which element comprises two superimposed support elements like two metal plates, concrete slabs, plaster sheets or wooden fibre sheets having between said elements discontinuously extending strips or grids of a viscoelastic material presenting air spaces between said strips or grids.

In the manufacture of said known type of structural element there is used a sheet of viscoelastic material which is on both sides covered with glue or an adhesive material, for instance a double sticking tape. For obtaining the intermediate strips of viscoelastic material of the product said composite viscoelastic sheet is cut into strips which are thereafter placed spaced from each other on a first support element, whereafter the second support element is laid down over said first support element having mounted thereon said spaced strips of viscoelastic material.

The cutting of the viscoelastic composite sheet material is complicated, both in that the cutting knife or roller knife easily sticks to the glue material; generally it is necessary to freeze the viscoelastic material in order to make it practically possible to cut it into strips; the known viscoelastic materials often are too hard to give a particularly good damping effect; the method is labour consuming and time consuming; there is often a risk that the composite structural element held together by the three-layer viscoelastic material, including both the damping strip itself and also the two glue or tape layers, is delaminated, which is in particular a problem in using the structural element in walls and ceilings.

The object of the invention therefore has been to suggest a structural composite element of the above mentioned type
- having improved sound damping and vibration damping properties as compared with previously known damping elements of the art;
- which element can be manufactured quickly and without involving much labour;
- which is more safely combined to a unitary product than the known elements;
- which can be safely applied even to porous support elements to form a safe joint between such elements;
- which is not apt to delamination;
- which has basically only one layer of material for providing both the connection between the two supporting element parts and for providing the particularly good damping effect;
- which can be manufactured in continuous lengths, and can be cut into desired plate sizes;
- which can be formed with cooperating groove and tenon means for interactively covering large surface areas, etc.

The inventioned is based on the observation
- that surprisingly good damping effects can be obtained by using certain synthetic elastomeric compounds,
- that the best damping effects are obtained if the viscoelastic material is provided in the form of strings, dots etc. which are spaced from each other, and if
- the viscoelastic material parts have a predetermined thickness and predetermined width,
- that certain viscoelastic materials have a long lasting damping capability and are very resistant to aging,
- that such elastomeric (viscoelastic) materials can successfully be used in an originally liquid form in the continuous process of manufacture of the structural building element,
- whereby a liquid viscoelastic glue or synthetic rubber material is applied in liquid form to one of the support elements in the form of spaced strings having a predetermined width and thickness, and onto which is thereafter the second support element press applied.

The liquid viscoelastic glue can be applied by portioning nozzles, by rollers or by any other known method whereby the first support element is preferably moved past the glue application means.

As examples of useful viscoelastic liquid material may be mentioned styrene rubber, nitrilic rubber, and still more preferably silicon rubber, chloroprenic rubber and acrylic rubber, all having good adhesive properties and all preferably having a temperature resistance or maximum service temperature of 100° C. or more to be able to stand the temperature rise occuring due to the internal friction of the viscoelastic material while subjected to sound and vibration.

In a preferred embodiment of the inventive method a first layer of the viscoelastic material, that is a glue or rubber material, is applied in liquid form to a first support element in the form of strings or dots etc. of a predetermined width and thickness to provide the intended viscoelastic layer; the glue is allowed to set or polymerize throughout, which will generally take about 4–8 hours at normal room temperatures; in a second step a thin layer of the same glue material is applied on top of the polymerized elastomeric layer as a connection means for the superimposed second support element; immediately thereafter said second support element is press applied on top of the thin connection layer; after the second glue layer has set or polymerized the structural element can be cut, trimmed, be formed with groove and tenon means etc.

Alternatively the liquid synthetic damping material is mould into strips having the desired thickness and width and are thereafter covered with a thin layer of an adequate glue on one side, preferaby the same type of material as that of the polymeric strip; before the glue has set the strip is applied to a first support element; is supplied with a thin layer of glue on the upper surface thereof; and the second support element is press applied to the first support element and the viscoelastic material.

It has proved that a thickness of between 1 and 5 mm, or preferably 1.5 to 2.5 mm of the damping viscoelastic layer gives a surprisingly good effect. A less good damping effect is obtained with damping strips, dots etc. having less thickness than 1.0–1.5 mm. It has been found that a fully covering damping layer gives a less good damping effect than several spaced strings of damping material. Depending on the type of load from which vibrations are to be dampened there may be used damping strings of said thickness having a width of about ten times the thickness, i.e. a width of about 10–50 mm.

The dampening strings preferably are spaced from each other by a distance which is about 5–10 times the width of the string, i.e. that the damping strings are spaced 50–500 mm. For a light weight load a spacing within the higher range of spacing is preferred, for a heavy load a spacing within the lower range of spacing is preferred.

In a still more preferred embodiment of the invention the structural element, consisting of the two support elements of board, timber, metal, concrete, plastic material etc. and having the viscoelastic strings therebetween, the element has a felt material glued to the bottom surface, that is the surface facing the mounting surface like the floor, the wall, the ceiling etc. Said felt material may be a natural or synthetic felt fibre material having a thickness which is 3–10 mm or preferably 5–10 mm and also preferably having a product weight of 300–1200 g/m². Very good damping effects have been acknowledged for ordinary house floor structural elements by using, at the bottom surface of the lower support element a 100% polyester felt of needle/thermally bonded fibres, having a product weight of 300–1200 g/m² and having a thickness of 3–10 mm, or preferably 5–9 mm. Other useful types of synthetic felt mats are made of viscose, polypropylene, polyurethane and polyamid (Nylon). Bonded glass fibre material may be incorporated as a reinforcing element in the felt mat. Also natural fibre mats of wool or cotton are useful but it should in some applications be foreseen that such mats are not subjected to moisture.

The invention is now to be described in connection to the accompanying drawing in which FIG. 1 is a fragmentary vertical cross section view of a first embodiment of a structural element according to the invention.

Figure 1:
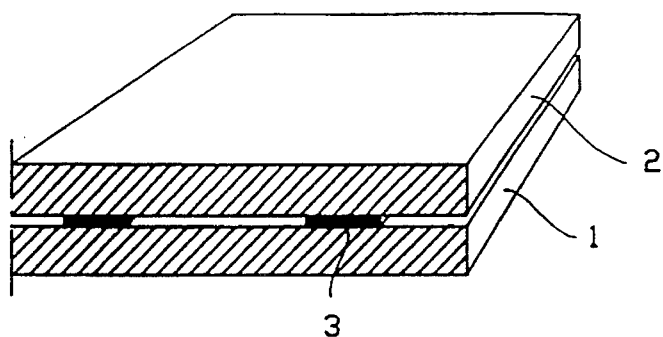

The structural element of FIG. 1 comprises two support plates 1 and 2 which are spaced from each other by means of spaced strings 3 of a viscoelastic material of the above mentioned type which may be a synthetic rubber material having a thickness of 1–5 mm, a width of 10–50 mm, and which strings may be spaced from each other by 50–500 mm. The support plates 1 and 2 can be of any known material like timber, fibre board, building board, chip board, plywood, metal plate, concrete, plastic plate or any combination of said materials. The thickness of the support plates 1 and 2 can be varied as desired and for the actual use. For an ordinary house floor structure the plates 1 and 2 may each have a width of 3–22 mm, or for many purposes preferably 8–15 mm. The lower plate 1, which is adapted to face the floor of the house can be made thinner than the upper plate 2, for instance so that the lower plate 1 has a thickness of 3–8 mm and the upper plate has a thickness of 8–22 mm—or vice versa.

Figure 2:
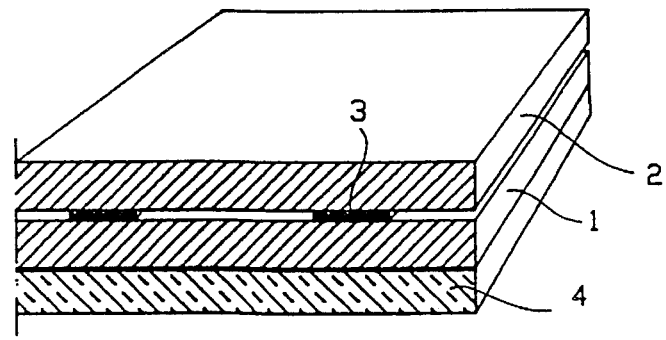
FIG. 2 shows an alternative structural element according the invention.

FIG. 2 shows an alternative embodiment of the structural element, which differs from that of FIG. 1 in that it is has a bottom felt mat 4 as defined above, for instance a polyester mat having a thickness of about 3–10 mm, which is glue connected to the bottom surface of the bottom support plate 1.

Figure 3:
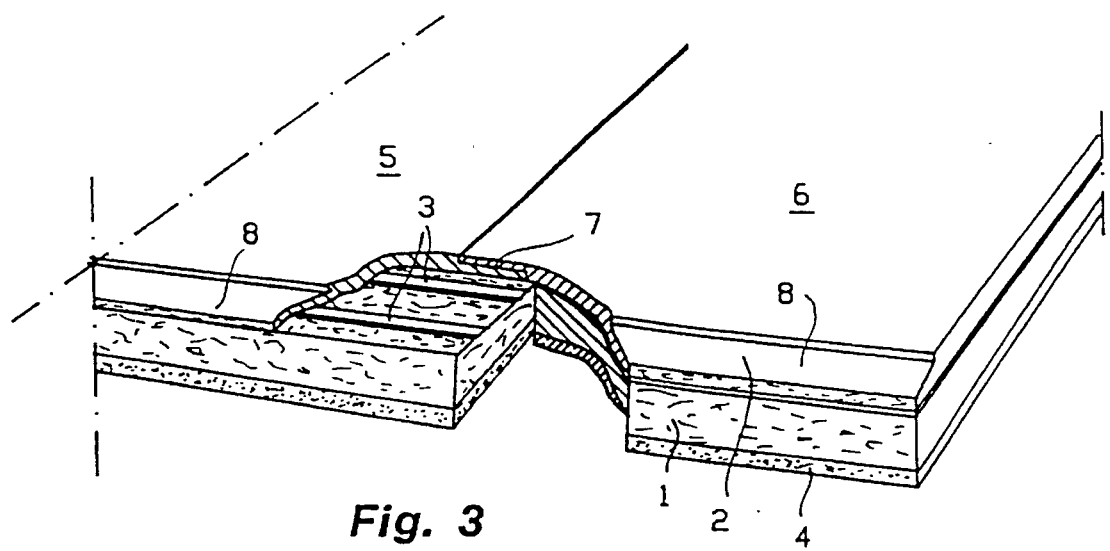
FIG. 3 shows, partially in a broken up view two structural elements connected to each other.

FIG. 3 shows two structural elements 5 and 6 adapted to be laid on a concrete base, on a light weight concrete base or on a timber base. The elements 5 and 6 are formed with groove and tenon means 7 and 8 at two edges or along all edges thereof for making it possible to join several elements to form for instance an integral floor, wall or ceiling of a housing.

Figure 4:
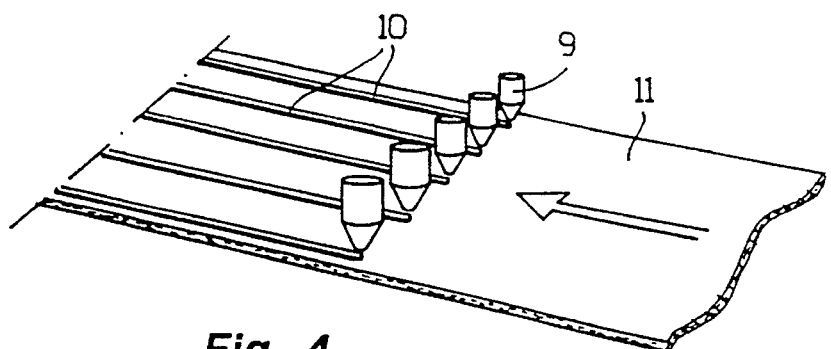
FIG. 4 is a perspective view illustrating a method of applying the viscoelastic material to a first support plate in the structural element of the invention.

In the method of the invention there is used a liquid viscoelastic material of the above mentioned type. As illustrated in FIG. 4 said fluid glue/dampening material is preferably applied by means of several parallel nozzles 9 each leaving a string 10 of dampening material on a bottom structural plate 11 moving at a controlled speed past the nozzles 9. Each nozzle 9 leaves a string of material which is of a predetermined width and thickness. The nozzles 9 are spaced with the same distance as the desired spacing of the strings 10. The spacing of the nozzles 9, like the speed of the bottom plate 11 and the thickness and width of the dampening strings 10 can be varied as desired considering the field of use for the dampening structural element. It is to be understood that the application of the dampening strings 10 can be made by hand or by means of rollers etc.

Figure 5:
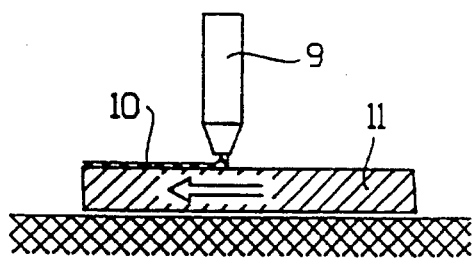
FIGS. 5–9 are five successive cross sectional views illustrating a preferred method of the manufacture of a structural element of the type shown in FIG. 2.
Figure 6:
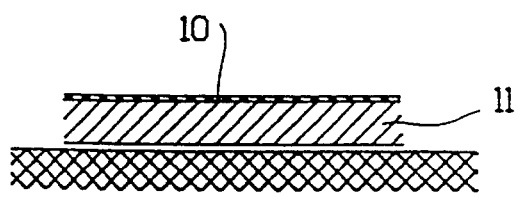
Figure 7:
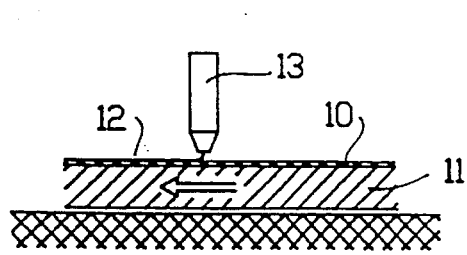
Figure 8:
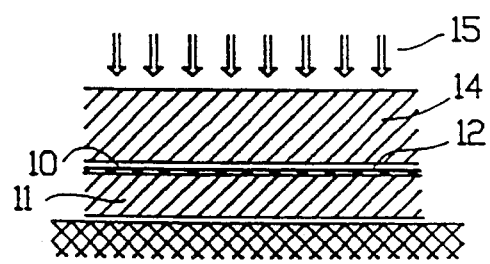
Figure 9:
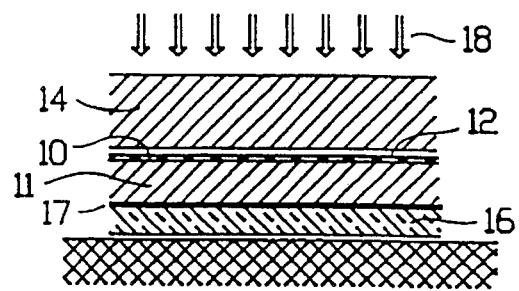

FIG. 5–9 diagrammatically illustrate a method of manufacturing a structural element according to the invention:

FIG. 5 illustrates how the bottom plate 11 is moved in the direction of the arrow past the nozzle 9 which deposits a string 10 of dampening material on top of the plate 11;

FIG. 6 illustrates that the dampening material 10 is allowed to completely set or polymerize which will take 4–6 hours at normal room temperature; the material may be kept in this condition for several days or weeks until the process is to be proceeded;

FIG. 7 illustrates that a thin layer 12 of a glue, preferably of the same material as in the dampening string 10 is laid out or sprayed onto said string 10 from a nozzle 13;

FIG. 8 shows that immediately thereafter the second support element 14, the upper element, is laid down on the strings 10, 12 of dampening material and is pressed thereon by a predetermined pressure 15, thereby completing the process for the manufacture of the structural element of FIG. 1;

In case of making the structural element of FIG. 2 a felt 16 is sprayed with glue 17 and the element completed in FIG. 8 is laid down on said felt 16 and is pressed thereto by a pressure 18, and the glue 17 is allowed to set or polymerize.

Alternatively to the method illustrated in FIGS. 5–9 it is also possible to mould the strings 10 separately by using the nozzles 9, whereby the strings can be moulded in or on an adhesive repellent material. After said moulded strings have polymerized completely they can be stored or can be used directly in the process, whereby a thin layer of glue is applied to one surface of the strings, or to the upper surface of the bottom plate 11, the strings are press connected to the plate 11, glue is applied to the upper surface of the strings 10 and the process proceeds like in FIGS. 7–9.

Figure 10:
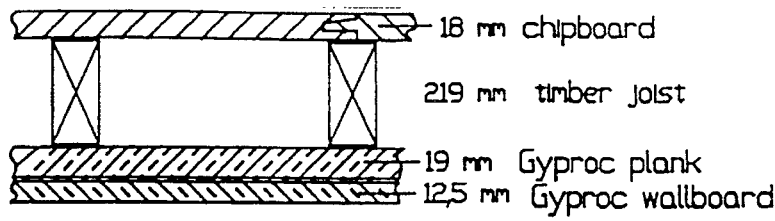
FIG. 10 is a diagrammatical cross section through an available floor/ceiling of a building in which the invention has been tested, referred to as Test 1.

FIG. 10 shows the sound transmission through an ordinary timber floor of an apartment house. As shown in the diagram the structural element of the invention is best suited for dampening of high frequency sound or vibrations but is also to some extent useful for low frequency sound or vibrations. The un-dampened sound transmission in the actual building is shown with the full line, the sound dampened by the structure of FIG. 1 is shown with the dotted line (- - -), and the sound dampened by the structure of FIG. 2 is shown with the broken line (-·-). It is obvious that there is obtained a substantial reduction of sound transmission by using the structural elements of the invention. A similar good effect is obtained for dampening of vibration and both sound and vibration in combination, whether the structural element is used in house building like in floors, walls or ceilings, or in machine boxes, in loud speakers, in motor cars, in boats, in airplanes etc.

It is to be understood that the structural element of the invention may be made both stiff and flexible. A flexible element, in which the plates are of metal plate or of plastics, and the complete element can be mounted on convex or concave surfaces, is well suited for use on curved surfaces like in motor cars, air planes, in boats and ships, in railway wagons, refrigerators, freezing boxes, many types of machine structures etc. The element is also well suited as a support base for machines, machine tools etc. thereby reducing the vibrations which otherwise necessarily are transmitted through the floor, in particular floors of concrete, metal etc.

Figure 14:
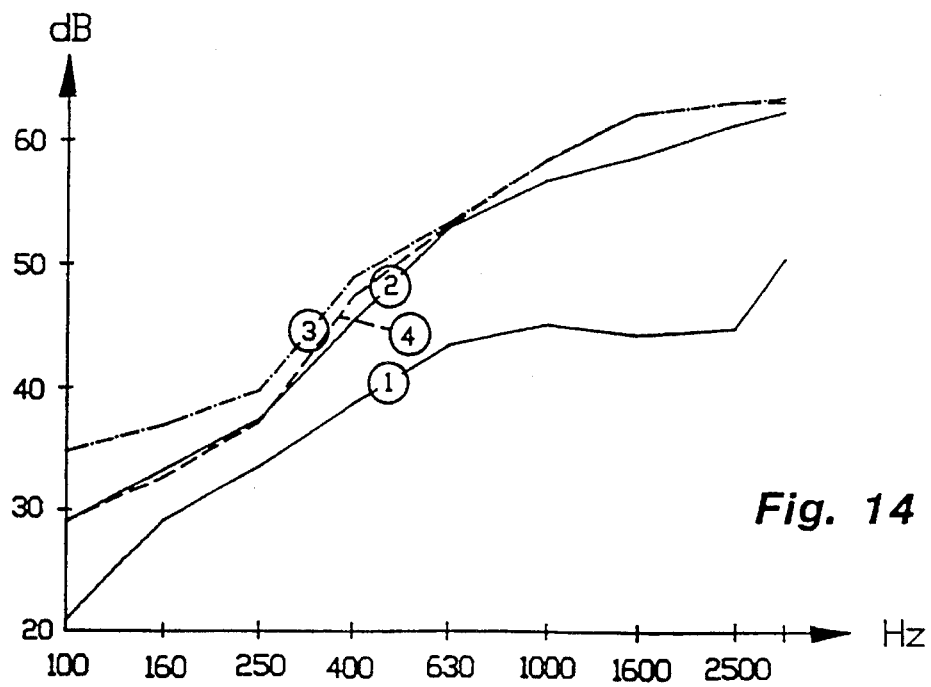
FIG. 14 is a diagram showing the damping of airborne sound passing the floor of FIGS. 11–13, and FIG. 15, finally, is a similar diagram showing the impact transmission through the same floor.
Figure 15:
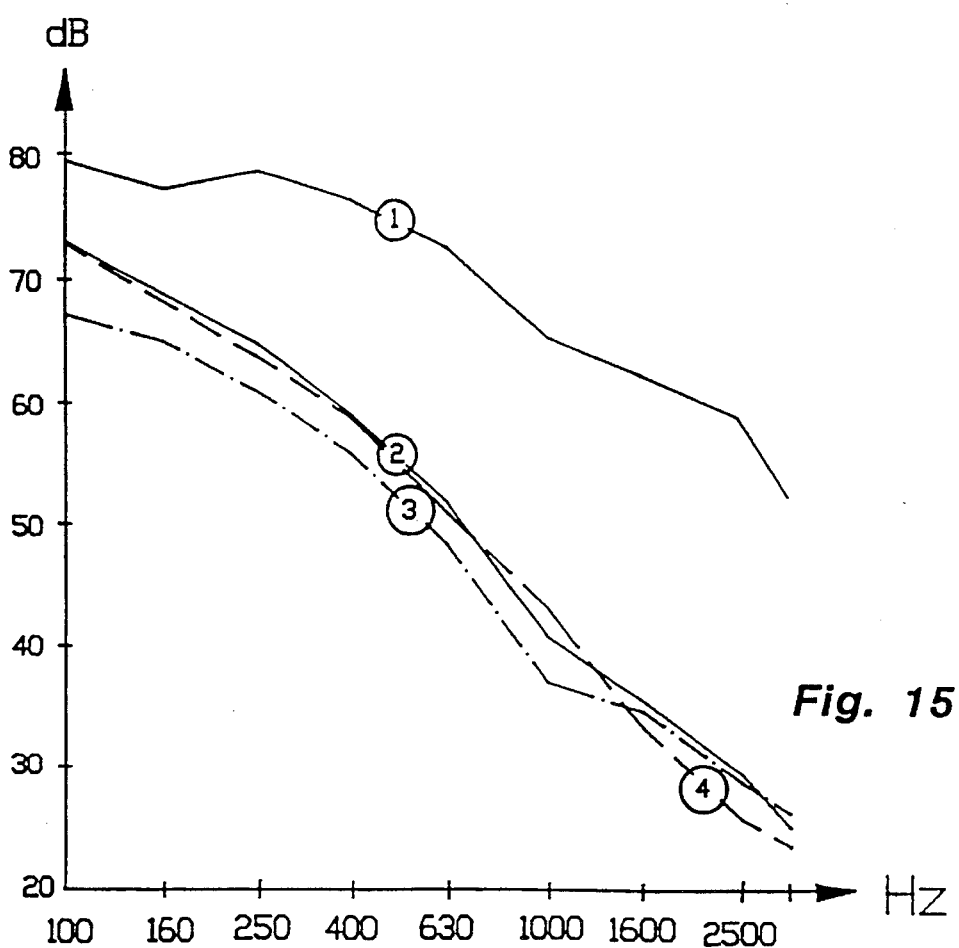

Tests have been made to determine the airborne sound insulation and the impact sound transmission of the products of the invention as illustrated in FIGS. 10–13, and the results thereof are shown in the diagrams of FIGS. 14 and 15. The tests were made in a test house comprising a two storey detached house of brick/block construction. All tests 1, 2, 3 and 4 were made in the same pair of rooms with the floor of the upper room modified to produce the various test configurations. The calculated area of the separating floor was 14 m². As shown in FIG. 10 the floor system comprised 29×44 mm timber joists set at 600 mm centres. The floor covering was 18 mm floring grade chipboard, and the ceiling in the bottom room was 19 mm Gyproc plank and 12,5 mm Gyproc wallboard fixed to the underside of the joists.

First the airborne sound insulation and the impact sound transmission were tested in Test 1, and the results thereof are plotted under point 1 of FIGS. 14 and 15, in which diagrams the horizontal axis shows the freuency in Hz and the vertical axis shows the sound level difference in decibel (dB), whereby the FIG. 14 illustrates the sound damping and FIG. 14 shows the impact sound transmission through the floor/ceiling. In Test 2 the floor was covered with a floor element of the type described in connection to FIG. 2 and consisting from top to bottom of 6 mm fibreboard bonded to 18 mm chipboard by beads of viscoelastic dampening material as described above spaced by 100 mm.

Figure 11:
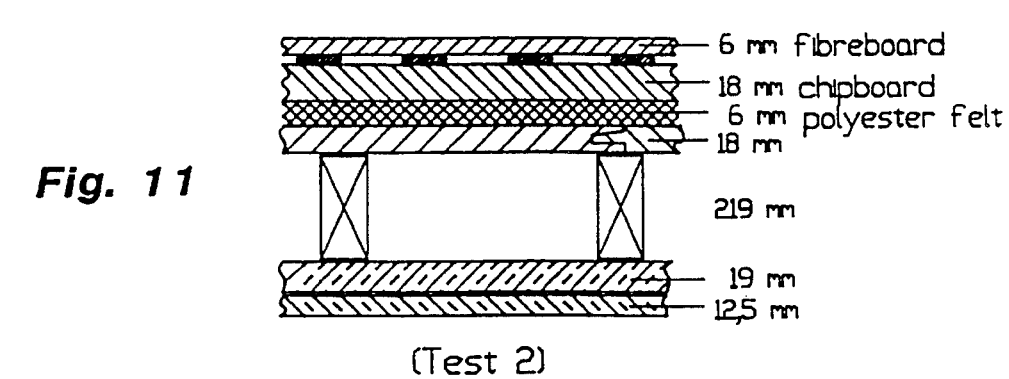
FIGS. 11, 12 and 13 are alternative embodiments of a damping element according to the invention mounted in the same building and referred to as Test 2, 3 and 4 respectively.

It is obvious that the floor of Test 2, shown in FIG. 11, had a surprisingly good airborne sound damping effect and a similarly surprisingly good reduction of impact sound transmission as compared with the original floor shown in FIG. 10.

Figure 12:
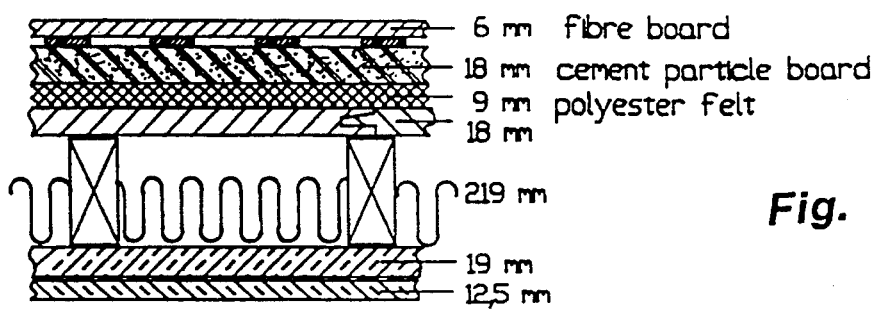
Figure 13:
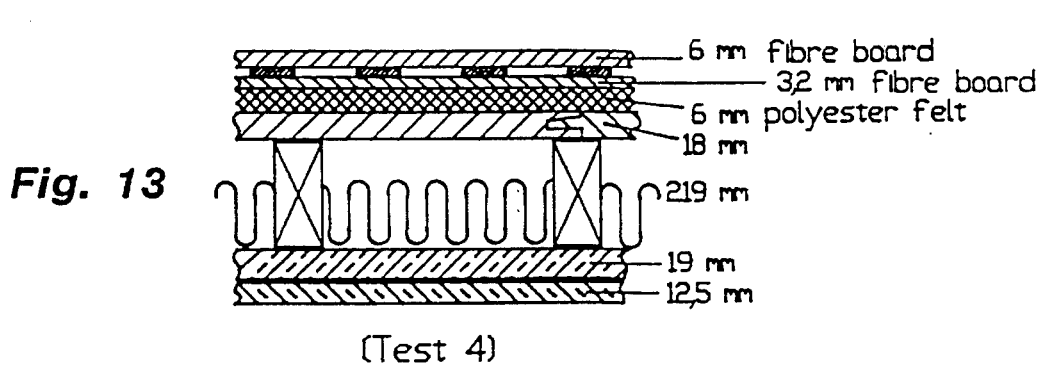

In Test 3 the chipboard layer of FIG. 11 was substituted by 18 mm cement particle board as illustrated in FIG. 12. In this case a sound slab of 100 mineral wool was laid between the joists. It is obvious that the sound damping and impact reduction was much better than for the original floor, and even better than that of Test 2.

To investigate the influence of the thickness of the support plates of the sound and vibration damping element Test 4 was carried out, whereby the floor element consisted of 6 mm fibreboard bonded to 3,2 mm fibreboard by strings of the claimed viscoelastic material. In this case the polyester felt had a thickness of only 6 mm.

As shown the sound and vibration damping effect was very similar to those of Test 2, and it therefore could be concluded that there is no need for having such thick floor element as in FIG. 11—except possibly for strength technical reasons—and that it is often quite sufficient to have only 6+3,2 mm thick support elements.

The diagrams of FIGS. 14 and 15 very clearly show the good effect of the element according to the invention.

| Reference numerals |
| --- |
| 1 support plate |
| 2 support plate |
| 3 string of viscoelastic material |
| 4 felt |
| 5 structural element |
| 6 structural element |
| 7 groove and tenon means |
| 8 groove and tenon means |
| 9 nozzle |
| 10 string of viscoelastic material |
| 11 bottom plate |
| 12 string of glue |
| 13 glue nozzle |
| 14 upper plate |
| 15 pressure application |
| 16 felt |
| 17 glue |
| 18 pressure application |

I claim:

1. An integral structural element having an outer surface for bonding to a support base, said element having improved sound and vibration dampening capacity comprising an upper support plate and a bottom support plate having therebetween spaced layers of a viscoelastic material, formed as strings or dots of elastomeric material which are spaced from each other leaving an air space between said support plates in the areas between adjacent strings or dots of elastomeric material and a felt mat of a natural or synthetic felt fibre material on said outer surface to be bonded to a support base.

2. A structural element according to claim 1, wherein the felt mat has a product weight of 300–1200 g/m² and a thickness of 3–10 mm.

3. A structural element according to claim 1 wherein the felt mat is selected from the group consisting of a polyester felt mat and a mat of viscose, polypropylene, polyurethane or polyamid, eventually bonded by a glass fibre material as a reinforcing element thereof.

4. A structural element according to claim 1, wherein the bottom support plate is of less thickness than the upper support plate, whereby the bottom support plate has a thickness of 3–8 mm and the upper support plate has a thickness of 8–22 mm.

5. A structural element according to claim 1 wherein the viscoelastic material is a synthetic elastomeric material applied in liquid form and chosen among the materials including styrene rubber, nitrilic rubber, silicon rubber, chloroprenic rubber and acrylic rubber, all having good adhesive properties, and all having a temperature resistance or maximum service temperature of 100° C. or more.

6. A structural element according to claim 5, wherein each spaced layer of viscoelastic material has a material thickness of between 1 and 5 mm, and a width of 10–50 mm, and the layers are spaced from each other by a distance of 50–500 mm.

7. A structural element according to claim 6, wherein the layers are spaced 50–200 mm.

8. A method of manufacturing a structural element having improved sound and/or vibration dampening capacity and being composed of a first support plate and a second support plate having therebetween spaced layers of a viscoelastic material, comprising applying several spaced strings of a viscoelastic synthetic damping material in liquid form, having a good adhesive activity in a thickness of 1–5 mm, a width of 50–500 mm and spaced from each other by a distance of 50–500 mm on the upper surface of a first support plate, allowing said liquid viscoelastic material to polymerize, applying a second thin layer of a viscoelastic synthetic glue in liquid form on top of the strings of polymerized viscoelastic material, pressing a second support plate onto the second layer of viscoelastic material, allowing the second glue layer to polymerize thereby forming an integral three-part structural element, and finally applying a mat of natural or synthetic felt material of a predetermined product weight, and a predetermined thickness, over the surface of the structural element so as to face the surface onto which the element is to be fastened;

trimming and cutting the structural element.

9. Method according to claim 8, wherein the strings of elastomeric material are applied by moving the first support plate at a predetermined speed past several nozzles laying out the strings of the polymeric material.

10. Method according to claim 9, wherein the strings of polymeric material are moulded separately allowed to polymerize completely, and the surface of each string is covered with a thin layer of glue.

* * * * *